(12) United States Patent
Hasegawa et al.

(10) Patent No.: US 7,982,911 B2
(45) Date of Patent: Jul. 19, 2011

(54) COLOR CONVERSION COEFFICIENT CREATING DEVICE, COLOR CONVERSION COEFFICIENT CREATING METHOD, AND COMPUTER READABLE MEDIUM STORING A PROGRAM FOR COLOR CONVERSION COEFFICIENT CREATION

(75) Inventors: Noriko Hasegawa, Kanagawa (JP); Kiyoshi Une, Saitama (JP); Yasuki Yamauchi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 640 days.

(21) Appl. No.: 11/785,385

(22) Filed: Apr. 17, 2007

(65) Prior Publication Data

US 2008/0013114 A1 Jan. 17, 2008

(30) Foreign Application Priority Data

Jul. 11, 2006 (JP) .................. 2006-190529

(51) Int. Cl.
*H04N 1/60* (2006.01)
(52) U.S. Cl. ....... 358/1.9; 358/3.23; 358/3.24; 358/518; 358/520
(58) Field of Classification Search .................. 358/1.9, 358/3.23–3.24, 518–520
See application file for complete search history.

(56) References Cited

U.S. PATENT DOCUMENTS

| | | | | |
|---|---|---|---|---|
| 5,450,216 A | * | 9/1995 | Kasson | 358/518 |
| 5,704,021 A | * | 12/1997 | Smith et al. | 358/1.9 |
| 5,909,291 A | * | 6/1999 | Myers et al. | 358/523 |
| 5,987,165 A | | 11/1999 | Matsuzaki et al. | |
| 6,351,320 B1 | * | 2/2002 | Shin | 358/1.9 |
| 6,560,356 B1 | * | 5/2003 | Takahashi et al. | 382/162 |
| 6,680,740 B2 | * | 1/2004 | Krueger | 345/601 |
| 6,778,300 B1 | * | 8/2004 | Kohler | 358/529 |
| 6,859,551 B2 | * | 2/2005 | Ohga | 382/167 |
| 6,897,988 B1 | | 5/2005 | Saito et al. | |
| 6,967,746 B1 | * | 11/2005 | Walker et al. | 358/1.9 |
| 7,161,710 B1 | * | 1/2007 | MacLeod | 358/1.9 |
| 7,227,666 B1 | * | 6/2007 | MacLeod | 358/1.9 |
| 7,333,240 B2 | * | 2/2008 | Amela et al. | 358/1.9 |
| 7,379,207 B2 | * | 5/2008 | Harrington | 358/1.9 |

FOREIGN PATENT DOCUMENTS

JP    A-9-135360    5/1997

(Continued)

OTHER PUBLICATIONS

Sep. 14, 2010 Office Action issued in Japanese Patent Application No. 2006-190529 (with translation).

*Primary Examiner* — Chan S Park
*Assistant Examiner* — Richard Z Zhu
(74) *Attorney, Agent, or Firm* — Oliff & Berridge, PLC

(57) ABSTRACT

A color conversion coefficient creating device including: a setting unit that sets a ratio between plural color rendering intents; an evaluating unit that evaluates characteristics of an input device and an output device; and a creating unit that creates a color conversion coefficient. The creating unit creates a color conversion coefficient for converting a first image signal in a first color space input from the input device into a second image signal for the output device in a second color space different from the first color space, according to the ratio between the color rendering intents and the evaluation result of the evaluating unit.

17 Claims, 14 Drawing Sheets

FOREIGN PATENT DOCUMENTS

| JP | A-2001-45310 | 2/2001 |
| JP | A-2003-209707 | 7/2003 |
| JP | A 2003-324620 | 11/2003 |
| JP | A 2004-153337 | 5/2004 |
| JP | A 2005-184601 | 7/2005 |
| JP | A 2005-184602 | 7/2005 |
| JP | A 2005-191808 | 7/2005 |
| JP | A-2005-269503 | 9/2005 |

* cited by examiner

F I G. 4
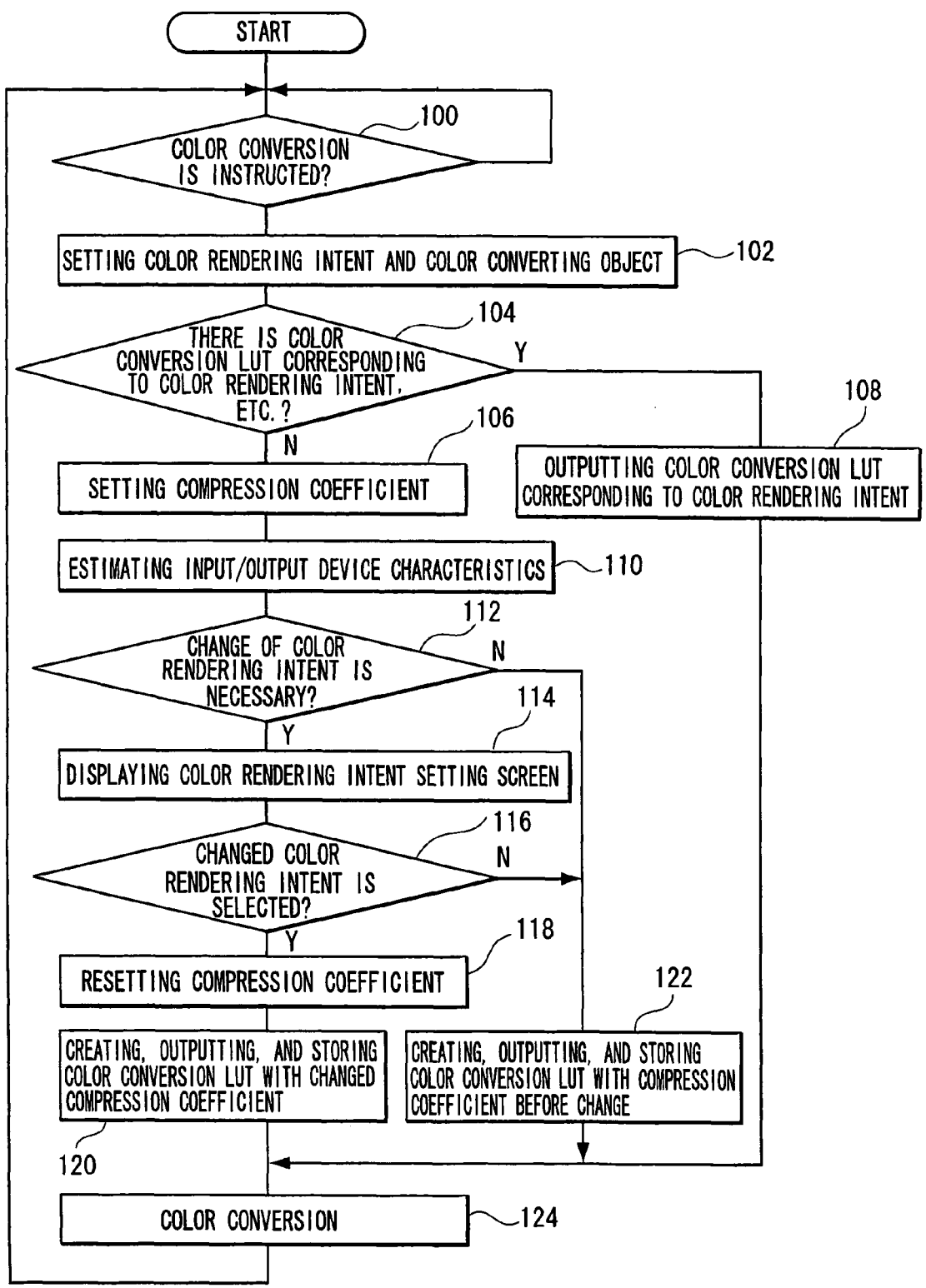

F I G. 7
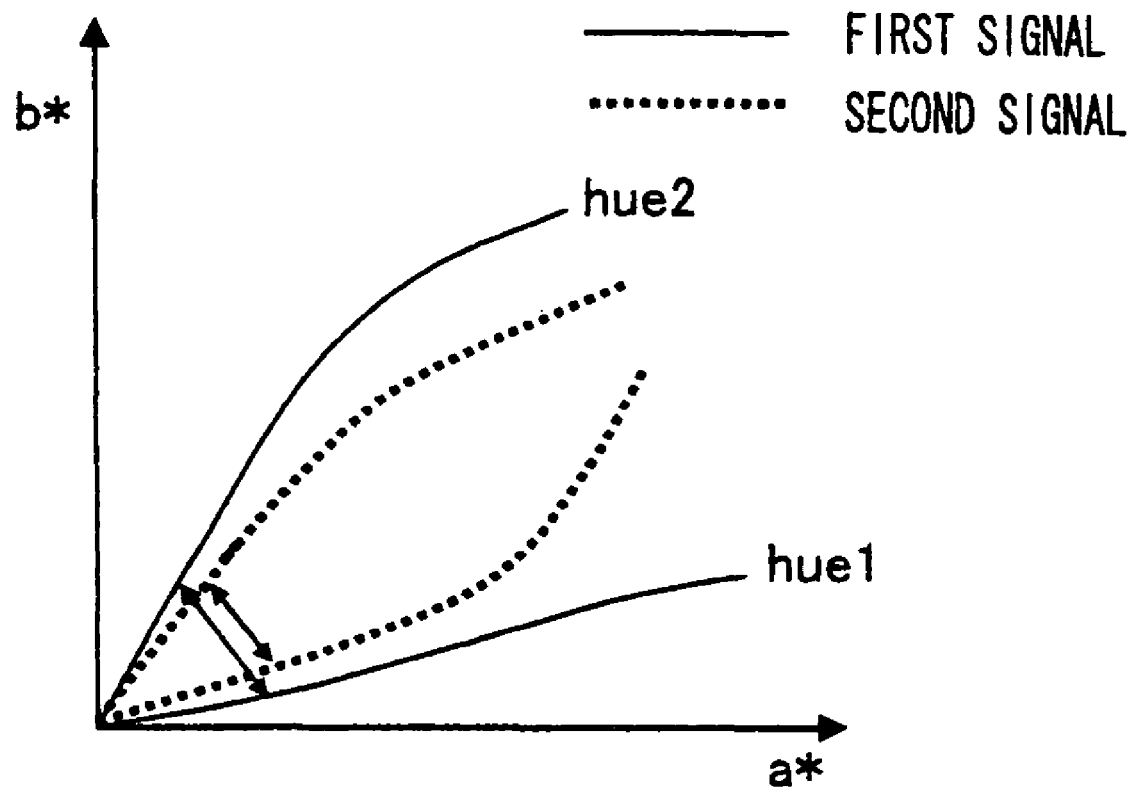

F I G. 10
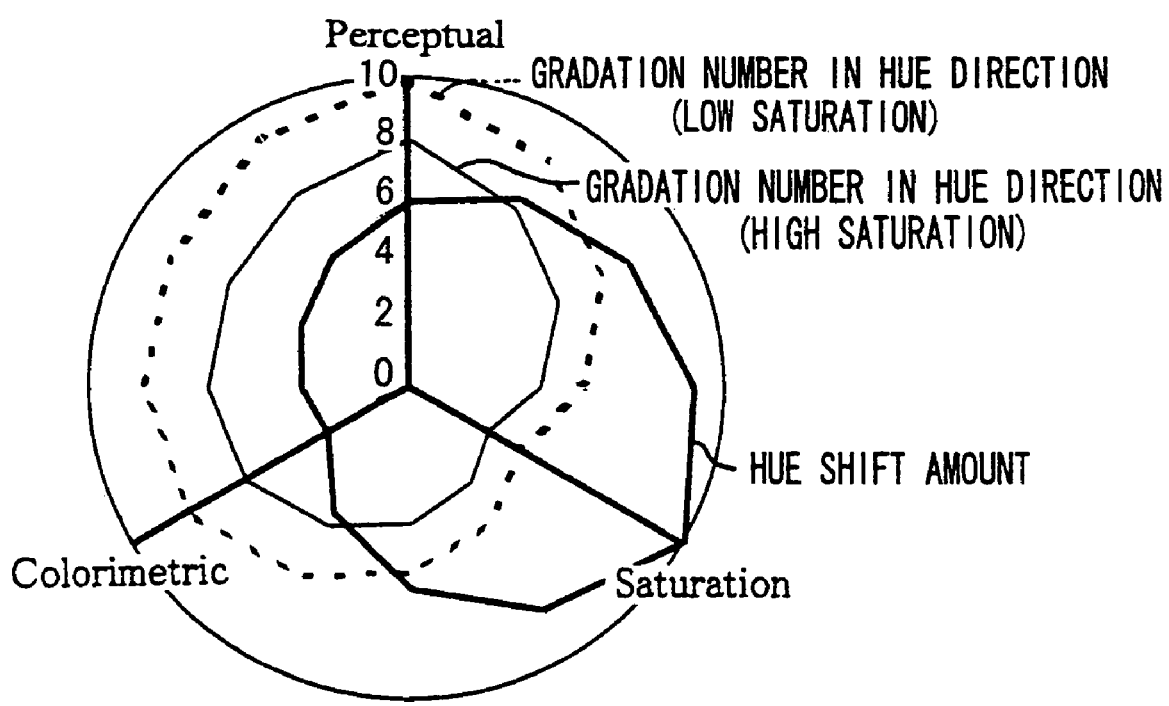

f(x) = (L'in / Lin) ^ (Cn1)  Cn1: COMPRESSION COEFFICIENT
L'out = L'in × (Lout / Lin) ^ f(x)

COLOR CONVERSION COEFFICIENT CREATING DEVICE, COLOR CONVERSION COEFFICIENT CREATING METHOD, AND COMPUTER READABLE MEDIUM STORING A PROGRAM FOR COLOR CONVERSION COEFFICIENT CREATION

CROSS-REFERENCE TO RELATED APPLICATIONS

This application is based on and claims priority under 35 USC 119 from Japanese Patent Application No. 2006-190529 filed Jul. 11, 2006.

BACKGROUND

1. Technical Field

The invention relates to a color conversion coefficient creating device, a color conversion coefficient creating method, and a computer readable medium storing a program for color conversion coefficient creation, and more particularly, to a color conversion coefficient creating device, a color conversion coefficient creating method, and a computer readable medium storing a program for color conversion coefficient creation, for executing a color conversion process for a color image signal when a reproducible color range of the color image signal is different between an input side and an output side.

2. Related Art

As a device for outputting a color image, there are display devices such as a CRT and a color LCD and printing devices such as a printer. Among these output devices, the reproducible color range is different because of a difference in an output method. A CRT may reproduce a vivid color in a region with high brightness because its output method is a fluorescent material lighting type. On the other hand, It is difficult to for a printer to reproduce a color with high brightness and high saturation other than the primary color because it generates a color while overlaying the color materials, and on the whole, it may reproduce a color in a region with low brightness.

In this way, color reproducible region is various depending on the output device. Therefore, when the same image data is supplied by the different output device, for example, when an image created on a CRT is printed by a printer, there may exist a color which is not able to be reproduced. For example, a color with high brightness and high saturation may be outputted on a CRT, but sometimes it may not be reproduced by a printer. On the contrary, a color with low brightness and low saturation may be reproduced by a printer, but sometimes it may not be displayed on a CRT. Therefore, at least the non-reproducible color is converted into a color that looks closest to it and outputted to the output device, thereby reproducing the whole image in the best quality in the output device. At this time, color mapping for substituting a color within the color reproducible region of the output device for a given color image signal is required.

As a conventional color mapping technique, there is a technique in which color conversion coefficients corresponding to various purposes are prepared and a color is converted with a color conversion coefficient corresponding to a desired purpose. For example, there is a color conversion using an ICC profile. In the ICC profile, three intents (Perceptual, Saturation, Relative Colorimetric) are prepared. These three modes are widely different in the purpose of use; for photo, for graphics, and for colorimetric matching and they don't necessarily agree with a user's purpose.

SUMMARY

In consideration of the above circumstances, the present invention provides a color conversion coefficient creating device, a color conversion coefficient creating method, and a computer readable medium storing a program for color conversion coefficient creation.

According to an aspect of the invention, there is provided a color conversion coefficient creating device comprising: a setting unit that sets a ratio between a plurality of color rendering intents; an evaluation unit that evaluates an input device characteristic and an output device characteristic; and a creating unit that creates a color conversion coefficient for converting a first image signal in a first color space input from the input device into a second image signal for the output device in a second color space different from the first color space, according to the ratio between the color rendering intents and the evaluation result of the evaluating unit.

BRIEF DESCRIPTION OF THE DRAWINGS

Exemplary embodiments of the present invention will be described in detail based on the following figures, wherein:

FIG. 4 is a flow chart of the processing executed by the color space signal converter;

FIG. 7 is a concept view showing an example of gradation characteristic in a hue direction;

FIG. 10 is a view showing an example of distribution of an element of gamut compression/decompression on a hue shift amount;

DETAILED DESCRIPTION

Figure 1:
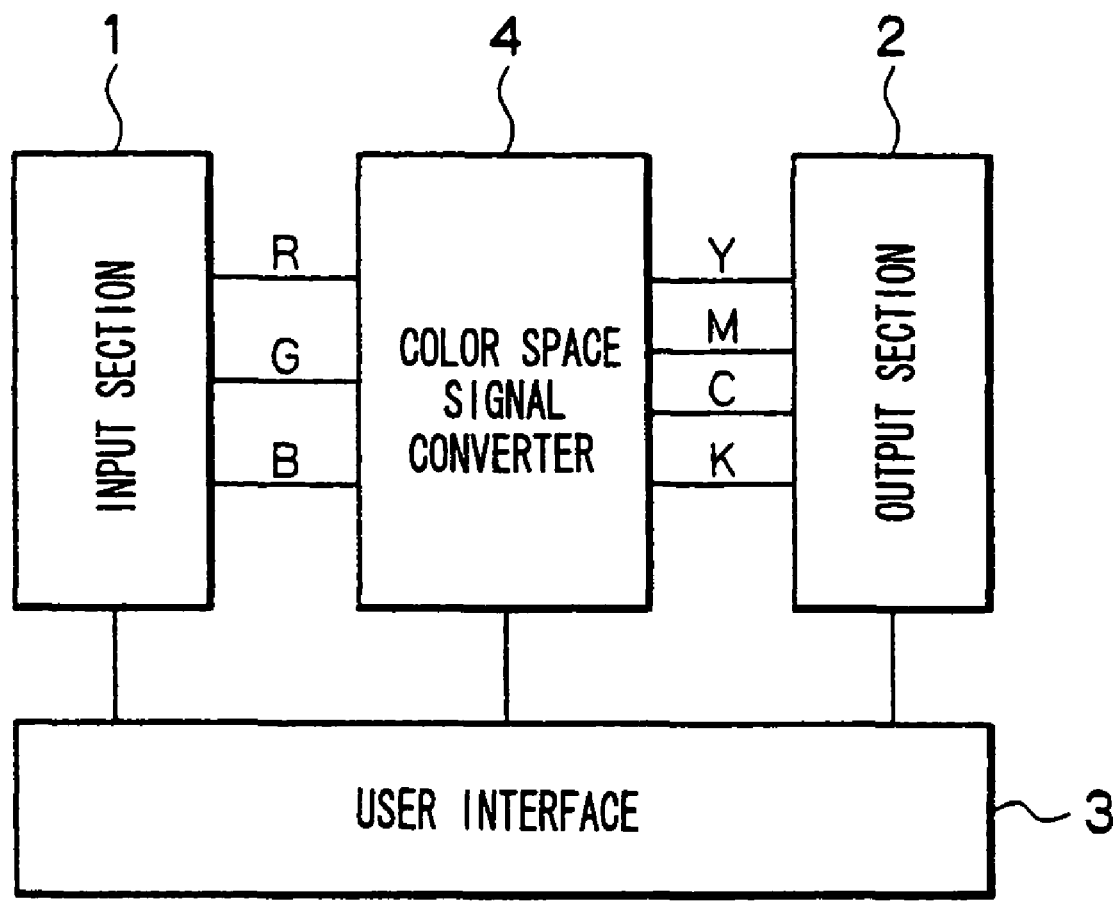
FIG. 1 is a block diagram showing a schematic constitutional example of a color converter according to the invention.

An exemplary embodiment of the invention will be hereinafter described in detail referring to the drawings.

At first, a schematic structure of an image processor will be described. FIG. 1 is a block diagram showing a schematic constitutional example of the color converter according to the invention. The color converter described here is to be used, mounted on an image output device such as a digital copy machine and a printer, on a server connected to the image output device, or on a computer (driver) giving an operational instruction to the image output device. As shown in FIG. 1, it includes an input section 1, an output section 2, a user interface 3 (hereinafter, abbreviated as "UI"), and a color space signal converter 4.

The input section 1 is to obtain an input image signal from an input device. The input image signal includes, for example, a color image signal in an RGB color space to be displayed on a CRT and the like, a color image signal in a CIELab color space, and a color image signal in a CMYK color space. In the exemplary embodiment, a description will be made in the case where an input image signal is the color image signal in the RGB color space.

The output section 2 is to output an output image signal to an output device. The output image signal includes, for example, a color image signal in a YMC color space and a color image signal in a YMCK color space to be printed by a printer. In the exemplary embodiment, a description will be made in the case where an output image signal is the color image signal in the YMCK color space.

The UI 3 is to perform various setting on the color space signal converter 4 according to a user's operation.

The color space signal converter 4 is to convert an input image signal obtained by the input section 1 into an output image signal to be outputted by the output section 2. The color space signal converter 4 does the above conversion after the gamut compression/decompression processing of the input image signal.

Figure 2:
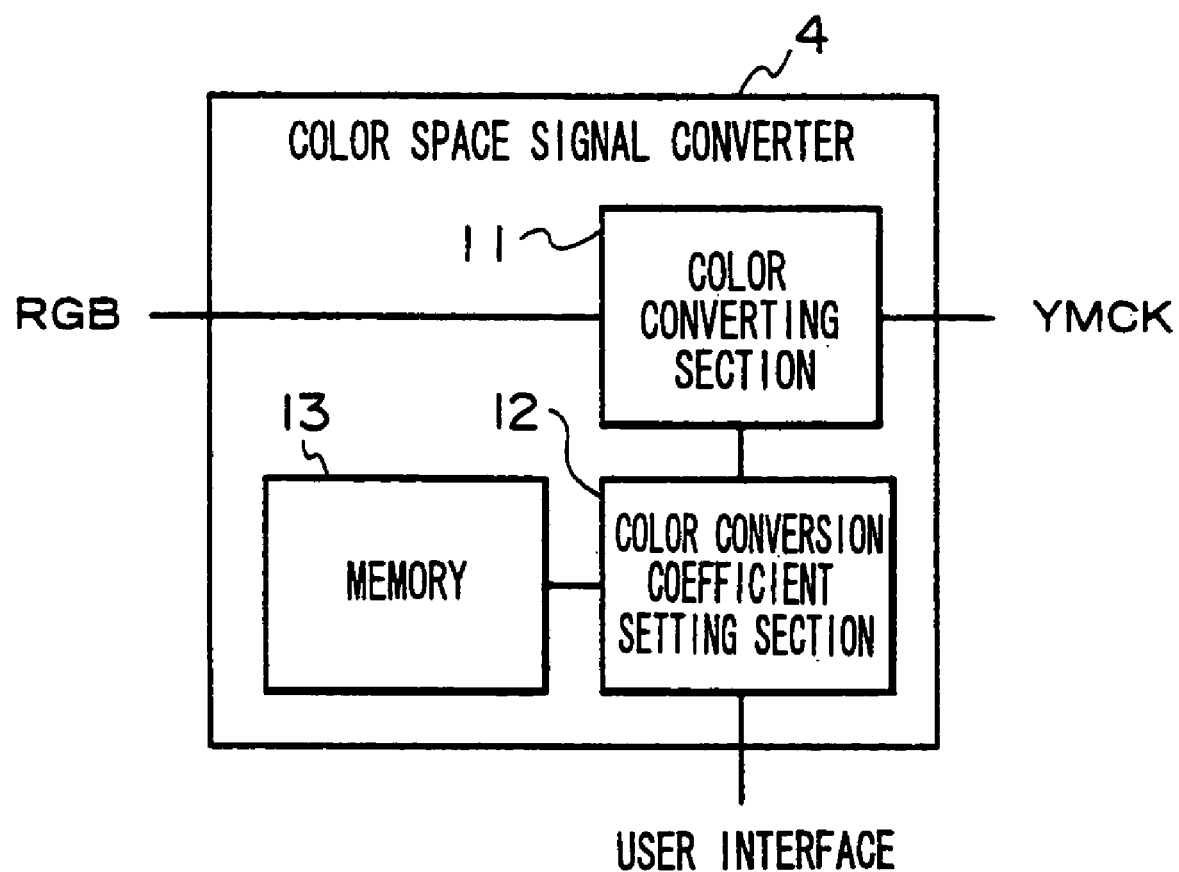
FIG. 2 is a block diagram showing a schematic constitutional example of a color space signal converter in the color converter.

Here, the color space signal converter 4 will be more specifically described. FIG. 2 is a block diagram showing a schematic constitutional example of the color space signal converter. As shown in FIG. 2, the color space signal converter 4 includes a color converting section 11, a color conversion coefficient setting section 12, and a memory 13.

The color converting section 11 converts the input image signal in the RGB color space into a signal (a first image signal) in a color space independent of a device, for example, the CIE-L*a*b* color space (a first color space), and after that, it converts the signal into an output image signal (a second image signal) in the YMCK color space according to a color conversion look-up table (LUT) created by the color conversion coefficient setting section 12 or a color conversion LUT stored in the memory 13.

These sections 11 to 13 are included in, for example, an image output device, a server, or a driver, and each of them may be realized by a predetermined program executed by a computer that is formed by a combination of a CPU (Central Processing Unit), a ROM (Read Only Memory), a RAM (Random Access Memory), and the like.

In the conversion processing of a color image signal, at first, each color gamut on the input side and on the output side is obtained in advance. At the time, it may be obtained in the color space independent of the device, for example, the CIE-L*a*b* color space. In the following description, the inner processing is performed in the CIE-L*a*b* color space.

Figure 3:
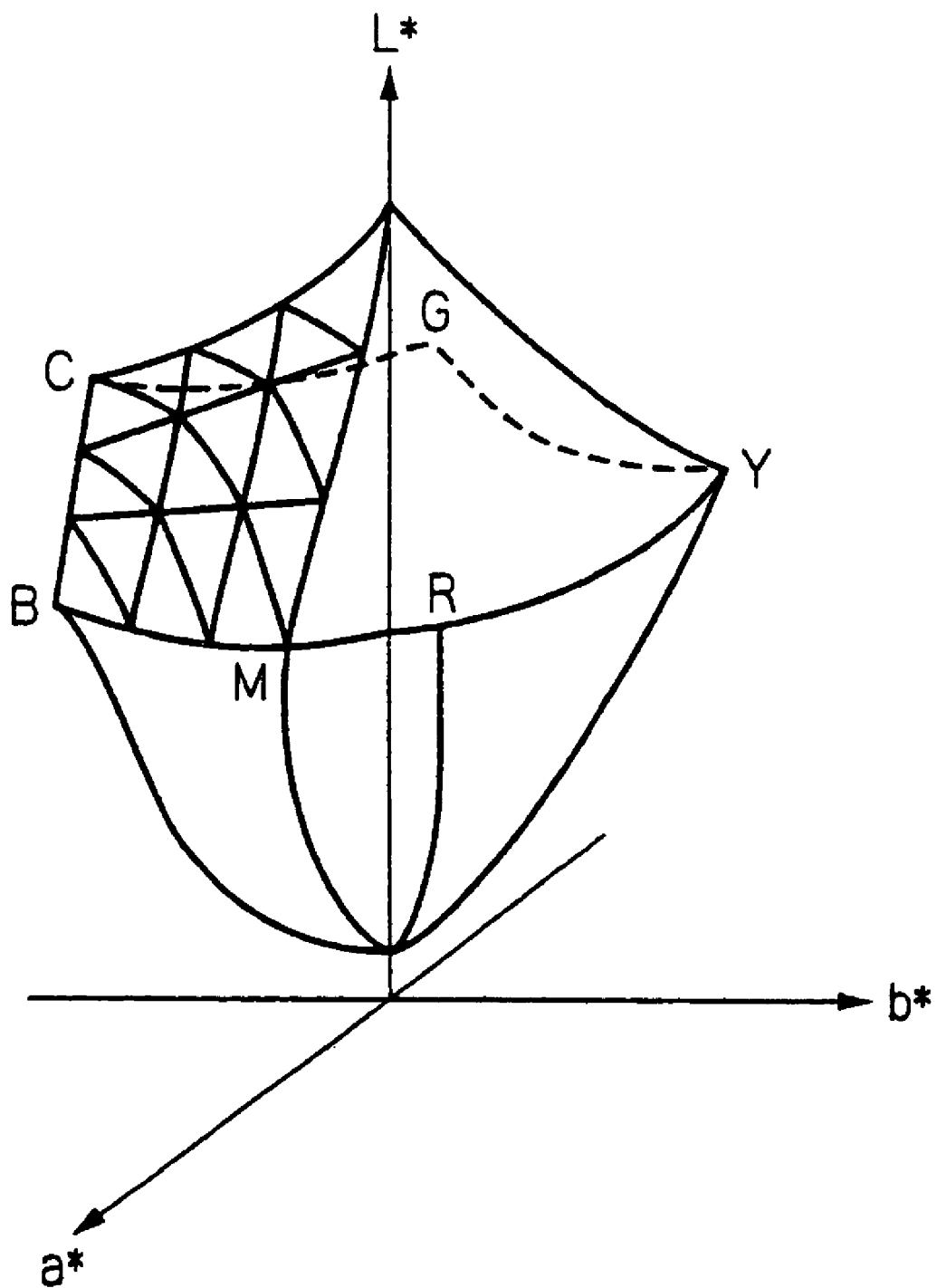
FIG. 3 is a concept view showing an example of a color gamut.

FIG. 3 is a concept view showing an example of a color gamut. Generally, the color gamut is not uniform, but it has a complicated three-dimensional shape as shown in FIG. 3. The inside of the three dimension, as illustrated, is the region in which a color may be reproduced, and the outside is a region in which a color may not be reproduced. Therefore, when a color gamut is required, information on the surface (outer surface) indicating a boundary between the region in which the color may be reproduced and the region in which the color may not be reproduced, is required. As the above, because the shape of the outer surface is not uniform, it may be expressed with the surface divided into polygon such as triangle. In FIG. 3, only one portion of the outer surface is illustrated with it segmented into the triangle shapes, but this segmentalization is performed on the whole outer surface.

The color gamut data about the obtained color gamuts on the input side and the output side and the data indicating device characteristics may be previously stored into the memory 13 of the color space signal converter 4 as an input device profile and an output device profile. The memory 13 stores the color conversion LUTs corresponding to the intents of the ICC profiles in every color converting object. Color conversion functions corresponding to the intents may be stored there for every color converting object.

Further, a standard input device profile and a standard output device profile indicating a predetermined standard input device characteristic and a predetermined standard output device characteristic are stored into the memory 13. The standard input device profile is, for example, a device profile of general color space such as sRGB profile and the standard output device profile is, for example, a device profile of a device having an average volume of the color gamuts of plural output devices.

Next, routine processing executed by the color space signal converter 4 will be described referring to a flow chart shown in FIG. 4.

At first, in Step 100, the color conversion coefficient setting section 12 determines whether or not a user has instructed the color conversion processing through the operation of the UI 3, and when the color conversion process is instructed, the processing moves to Step 102.

In Step 102, the color conversion coefficient setting section 12 makes the UI 3 display a setting screen, not illustrated, for setting a color rendering intent and a color converting object, hence to induce a user to set a color rendering intent and a color converting object. As the color rendering intent, there are the above-mentioned three intents (Perceptual, Saturation, Relative Colorimetric) defined in the ICC profile. They show the characteristics of color reproduction such as monitor emphasizing, saturation emphasizing, gradation reproducibility, contrast, and colorimetric matching, which are required in an output environment desired by a user. As the color converting object, there are such as natural image, graphic, text, and gradation, but it is not limited to them. In addition to the color rendering intent and color converting object, a specified color which is especially desired to be converted (for example, red) and the conversion target value (for example, colorimetric value) may be settable. In this case, when the specified color is a main color (for example, C, M, Y, R, G, and B), even if the main color has the color conversion target, priority is given to the conversion of the set conversion target value.

In the setting of the color rendering intent, for example, one of the three intents may be set singularly, or a ratio between at least two of the three intents and more may be set. The ratio between the intents may be set directly by a user, or a rate of each intent may be expressed on three axes crossing each other and any position may be specified in the three dimension space, hence to set the coordinates of the position as the ratio among the intents. By setting the ratio among the intents, color including a desired ratio of each intent characteristic may be reproduced and color in accordance with a user's intention may be reproduced.

Alternatively, the intents are not limited to the above three intents defined by the ICC profile, but they may be set in an expression easy to recognize the color rendering intent instinctively, such as monitor emphasizing, saturation emphasizing, gradation reproducibility, contrast, and colorimetric matching.

In Step 104, the color conversion coefficient setting section 12 determines whether or not the color conversion LUT corresponding to the set color rendering intent and set color converting object is stored in the memory 13. In the memory 13, at first, for example, the color conversion LUT corresponding to each color converting object is previously stored for every intent. The color conversion LUT is the data indicating the correspondence, with the three dimensional CIE-L*a*b* color space divided into plural rectangular solids, among the values of L*, a*, b* on a lattice point in each solid and the values of YMCK in the YMCK color space in the output device. Not only the color conversion LUT of Lab-YMCK but also the color conversion LUT of RGB-YMCK may be previously stored in the memory 13.

When the color conversion LUT corresponding to the color rendering intent and the color converting object which is set in Step S102 is stored in the memory 13, the processing moves to Step 108, while when it is not stored, it moves to Step 106.

In Step 108, the color conversion coefficient setting section 12 reads out the color conversion LUT corresponding to the set color rendering intent and the set color converting object from the memory 13 and outputs it to the color converter 11.

On the other hand, when the color conversion LUT corresponding to the set color rendering intent and color converting object is not stored in the memory 13, the compression coefficient of the gamut compression/decompression function (color conversion function) in the gamut compression/decompression processing of the input image signal is set in Step 106.

Figure 5:
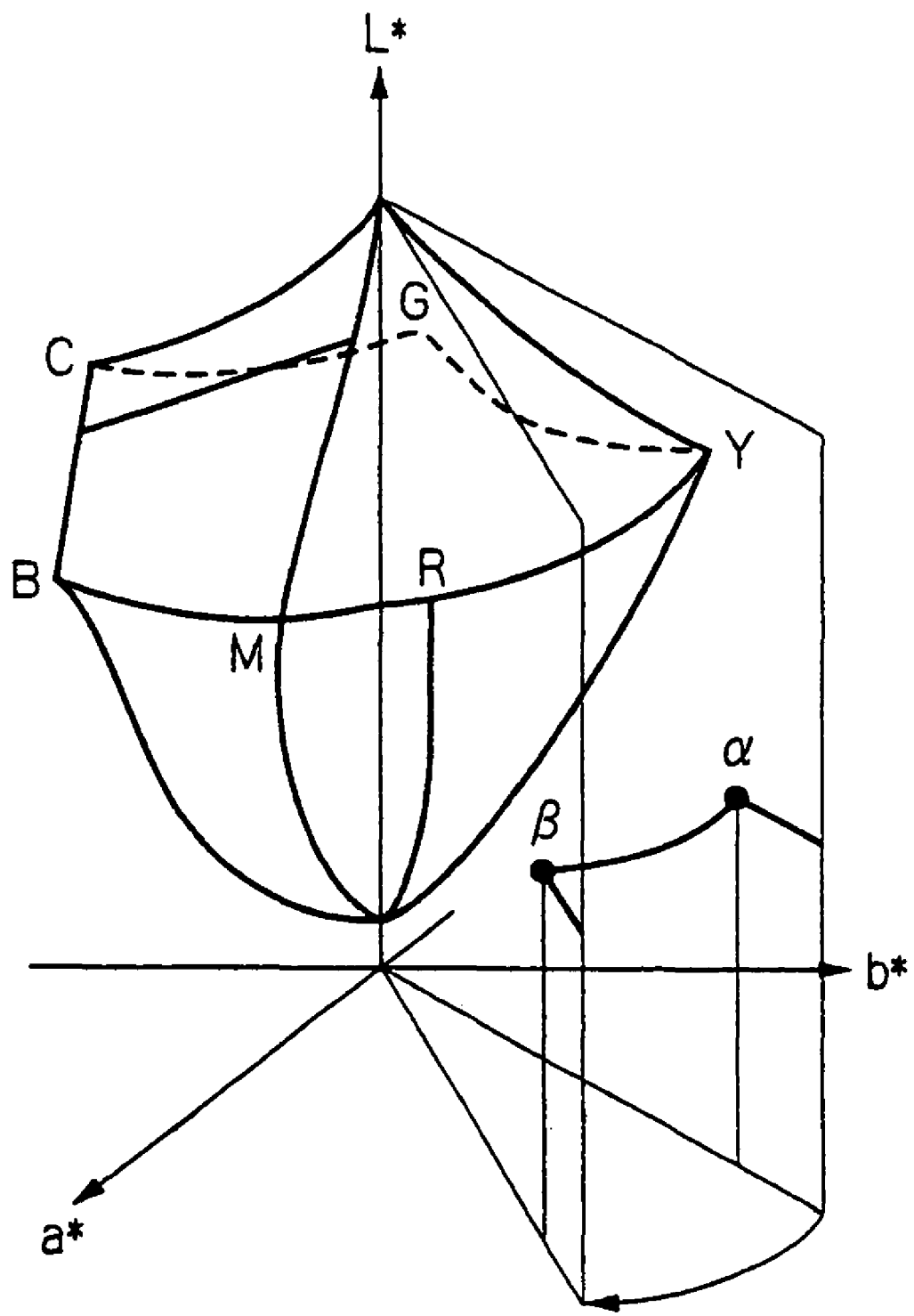
FIG. 5 is a concept view of hue changing processing in a hue converter.

As characteristics of the gamut compression/decompression, for example, there are a hue conversion characteristic, a brightness conversion characteristic, a brightness and saturation compression characteristic, a gradation characteristic in a hue direction, and a gradation characteristic in a saturation direction. The hue conversion characteristic is to indicate the conversion characteristic in the hue direction, including a hue shift amount for every hue region and the like. FIG. 5 is a concept view showing an example of the hue changing processing. In the CIE-L*a*b* color space, hue is changed by rotational movement around the L* axis. For example, the color of a point α shown in FIG. 5 is rotated through the hue conversion processing, into the color of a point β.

The brightness conversion characteristic is to show the conversion characteristic in a brightness direction, where a brightness conversion amount is determined according to the saturation.

Figure 6:
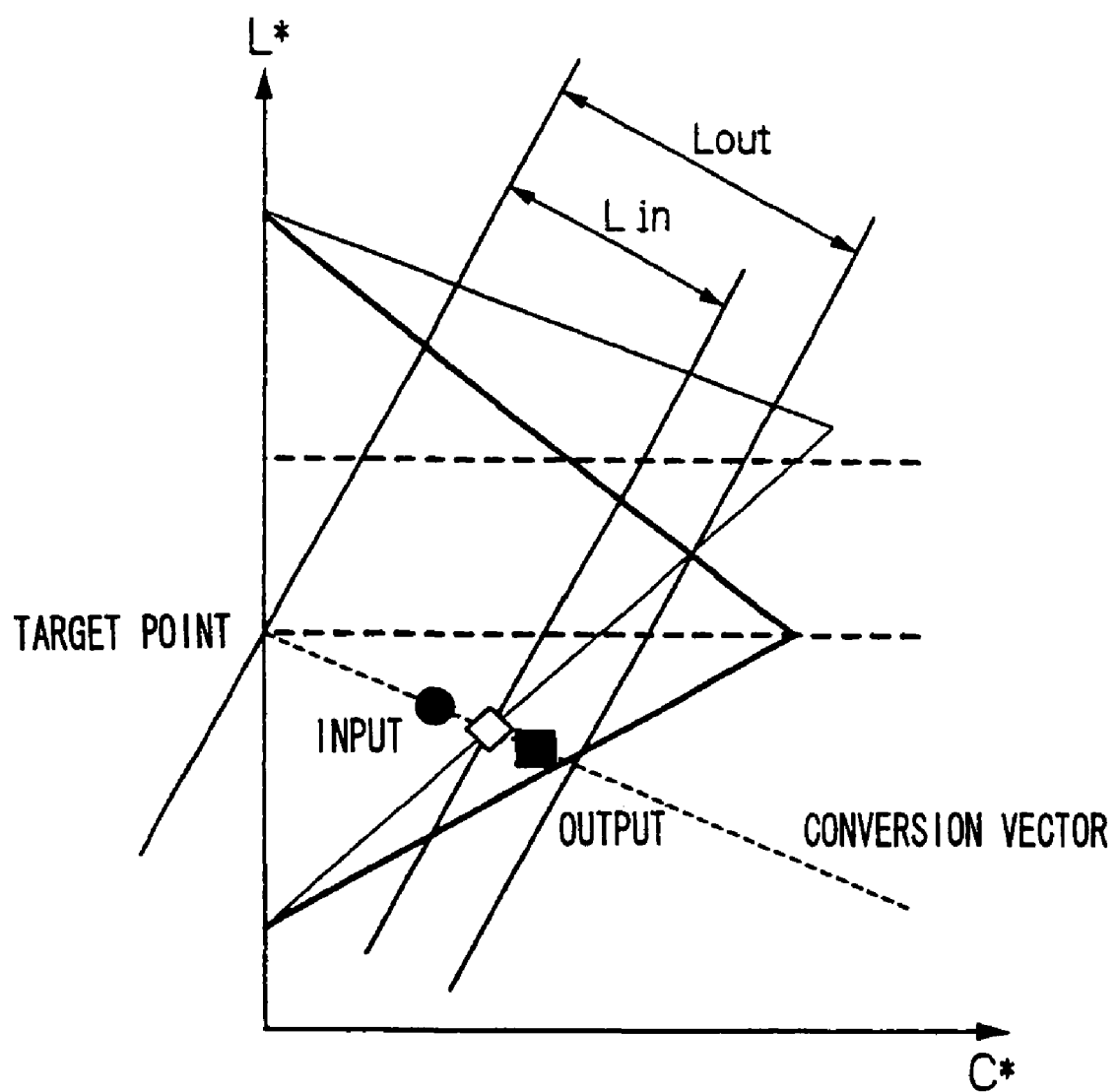
FIG. 6 is an explanatory view showing an example of gamut compression/decompression processing.

The brightness and saturation compression characteristic is to show a compression characteristic in a brightness and saturation direction at a time of compressing an input image signal into an output image signal. FIG. 6 is a concept view showing an example of the compression processing in the brightness and saturation direction. In this case, for example, an achromatic color that has the brightness of a point having the maximum saturation in the color gamut (shown by the heavy line in FIG. 6) is a target point, a line connecting the target point with the input image signal is set as a conversion vector, and the input image signal is compressed on the conversion vector, hence to obtain the output image signal (the detail will be described later).

The gradation characteristic in the hue direction is to show crudeness of the conversion at a time of conversion into the hue direction. FIG. 7 is a concept view showing an example of the gradation characteristic in the hue direction. The first signal indicates a signal before the conversion and the second signal indicates a signal after the conversion. Although the hue of the high saturation region or of the maximum saturation point of each hue is converted through the above hue conversion processing, the gradation characteristic in the hue direction shows that one in the other region than the high saturation region or the maximum saturation point of the hue, between a predetermined hues (hue 1 and hue 2). In FIG. 7, from a low saturation to a middle saturation, the gradation in the hue direction of the first signal is kept, the high saturation region decreases in the gradation in the hue direction.

Figure 8:
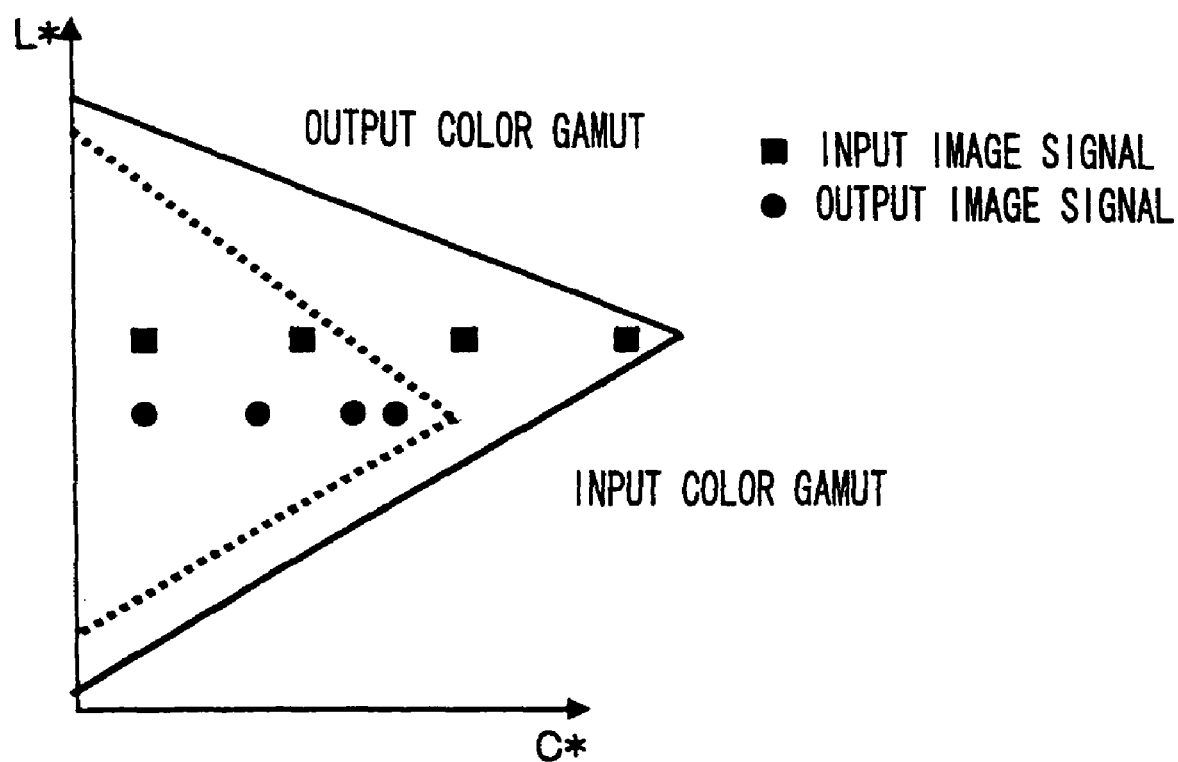
FIG. 8 is a concept view showing an example of gradation characteristic in a saturation direction.

FIG. 8 is a concept view showing an example of a gradation characteristic in a saturation direction. In FIG. 8, the gradation characteristic in the saturation direction of the input image signal has such a characteristic that in the output image signal obtained by converting the input image signal, the gradation decreases in the high saturation region and increases in the lower saturation region.

FIGS. 9 to 12 respectively show an example of relation between the distribution of gamut compression/decompression elements and the color rendering intents. As the element of gamut compression/decompression, for example, there are brightness and saturation compression ratio, hue shift amount, gradation number in the hue direction, brightness shift amount, saturation gradation number and the like.

Figure 9:
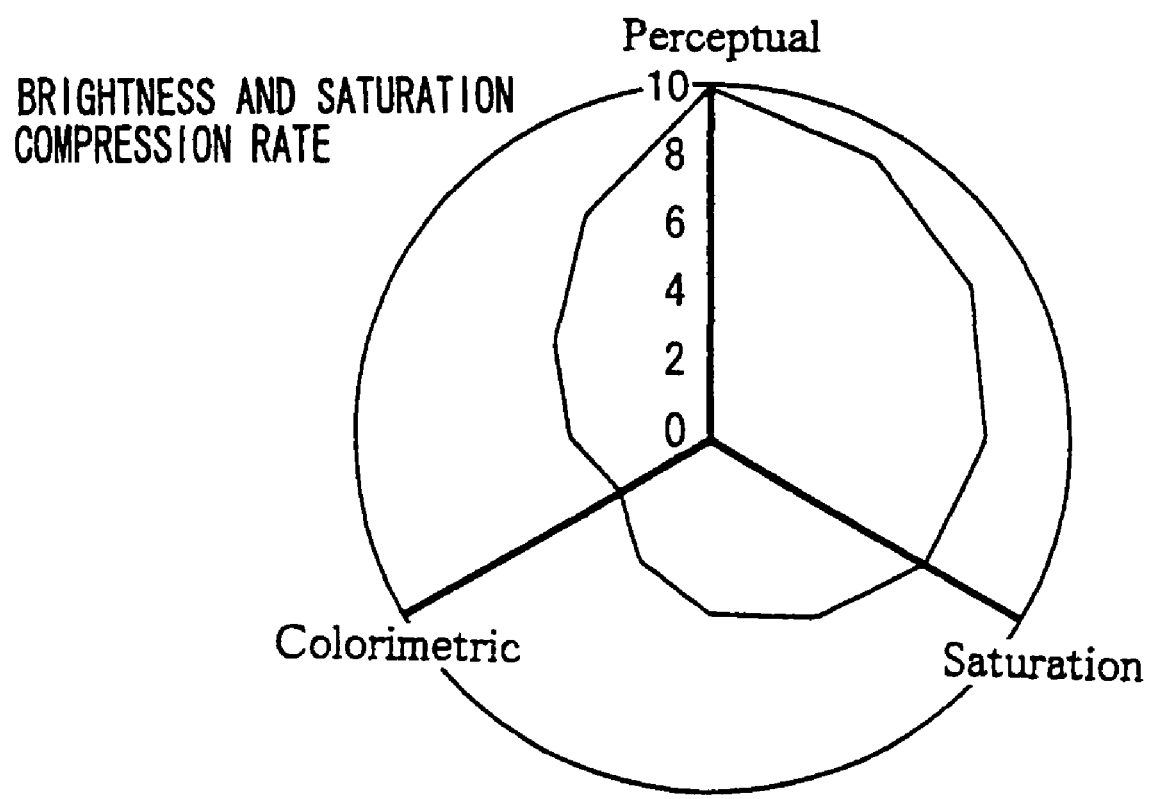
FIG. 9 is a view showing an example of distribution of an element of gamut compression/decompression on a brightness and saturation compression ratio.

FIG. 9 shows an example of the element distribution of the brightness and saturation compression ratio. As shown in FIG. 9, the distribution goes that the brightness and saturation compression ratio is the highest in Perceptual and decreases in the order of Saturation and Colorimetric.

FIG. 10 shows an example of the element distribution of the hue shift amount and the gradation number in the hue direction. As shown in FIG. 10, the distribution goes that the hue shift amount is decreasing in the order of Saturation, Perceptual, and Colorimetric and that the gradation number in the hue direction is decreasing in the order of Perceptual, Colorimetric, and Saturation. Further, the characteristic of the change is different between the high saturation region and the low saturation region.

Figure 11:
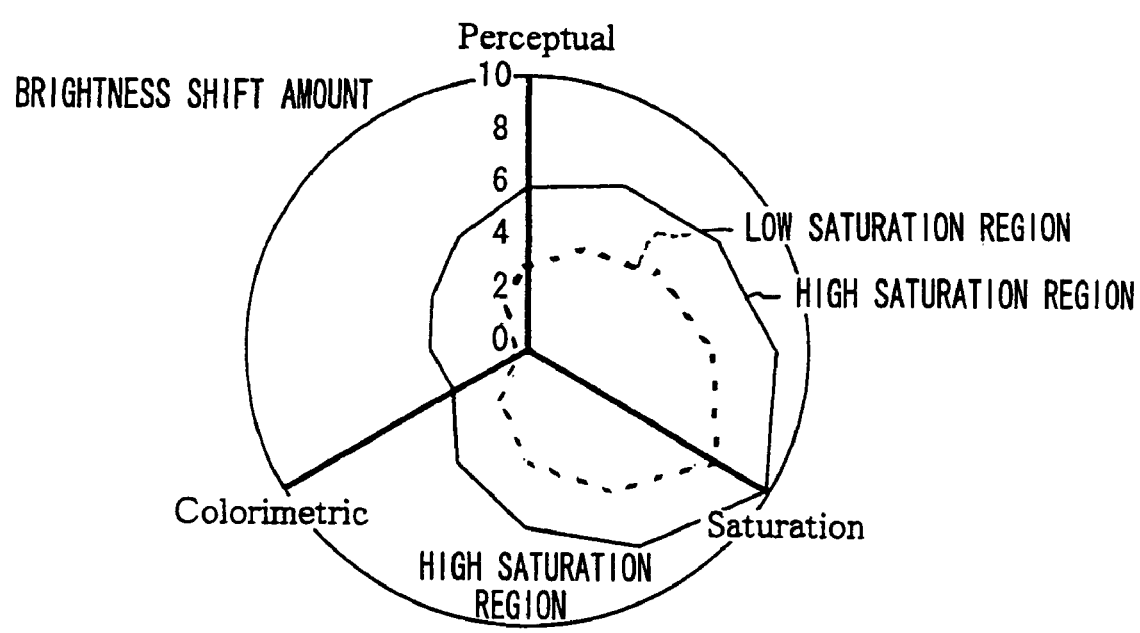
FIG. 11 is a view showing an example of distribution of an element of gamut compression/decompression on a brightness shift amount.

FIG. 11 shows an example of the element distribution of the brightness shift amount. As shown in FIG. 11, the distribution goes that it is decreasing in the order of Saturation, Perceptual, and Colorimetric. Similarly, the characteristic of the change is different between the high saturation region and the low saturation region.

Figure 12:
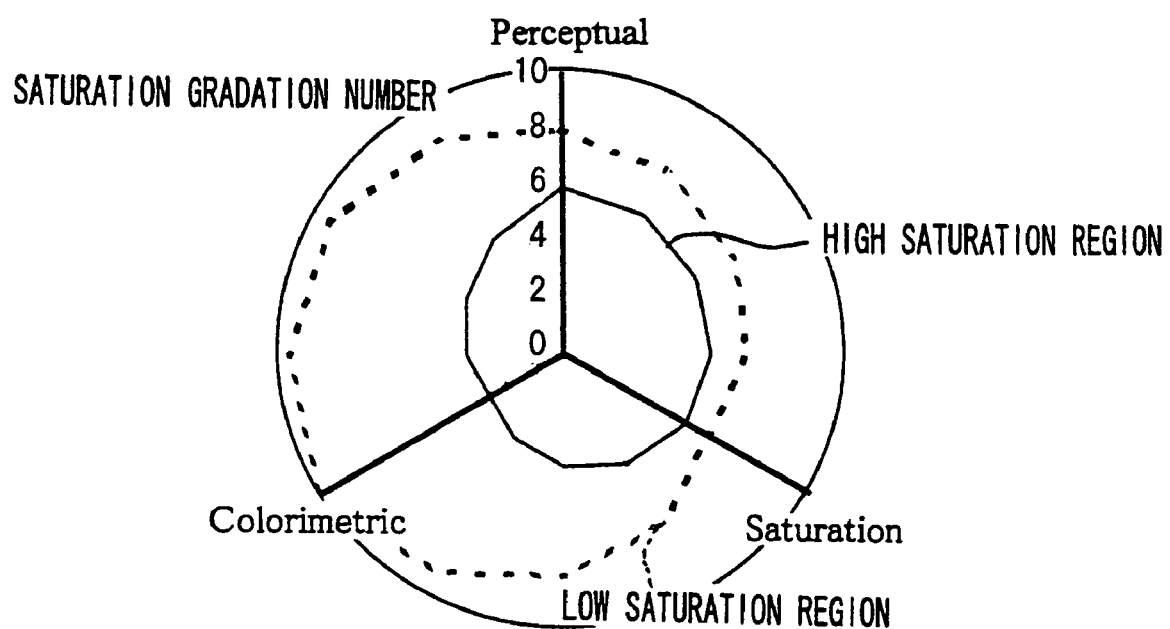
FIG. 12 is a view showing an example of distribution of an element of gamut compression/decompression on a saturation shift amount.

FIG. 12 shows an example of the element distribution of the saturation gradation number. As shown in FIG. 12, the distribution goes that the saturation gradation number of the low saturation region is high in Colorimetric and the saturation gradation number of the high saturation region is high in Perceptual.

The above-mentioned characteristic of the gamut compression/decompression varies depending on the compression coefficient included in each gamut compression/decompression function. Therefore, in Step 106, the color conversion coefficient setting section 12 sets the gamut compression/decompression function by setting the compression coefficient corresponding to the color rendering intent and color conversion object set in Step 102. The compression coefficient may be previously stored into the memory 13 as the compression coefficient table data, for example, for every intent (including perceptual 2, perceptual 3 or the likes which will be described later), for every ratio among intents, for every color conversion object, or for every gamut compression/decompression element, hence to obtain and set the compression coefficient corresponding to the intent and color converting object selected by a user. It is not limited to this, but anything will do as far as it is possible to set the compression coefficient corresponding to the color rendering intent and color converting object set by a user.

Here, a compression method will be described. At first, as the compression method relating to the above-mentioned brightness and saturation compression ratio and the saturation gradation number, the method described in, for example, Japanese Patent Application Laid-Open No. 2005-191808 may be adapted. The compression coefficient Cn11 of this compression method is included in the non-linear function as a parameter, for converting the input image signal into the output image signal and it is the parameter for specifying the compression ratio on the above-mentioned conversion vector. Therefore, the compression coefficient Cn11 is specified according to a distance between the target point (achromatic color point) on the conversion vector and the point showing the input image signal.

Figure 13:
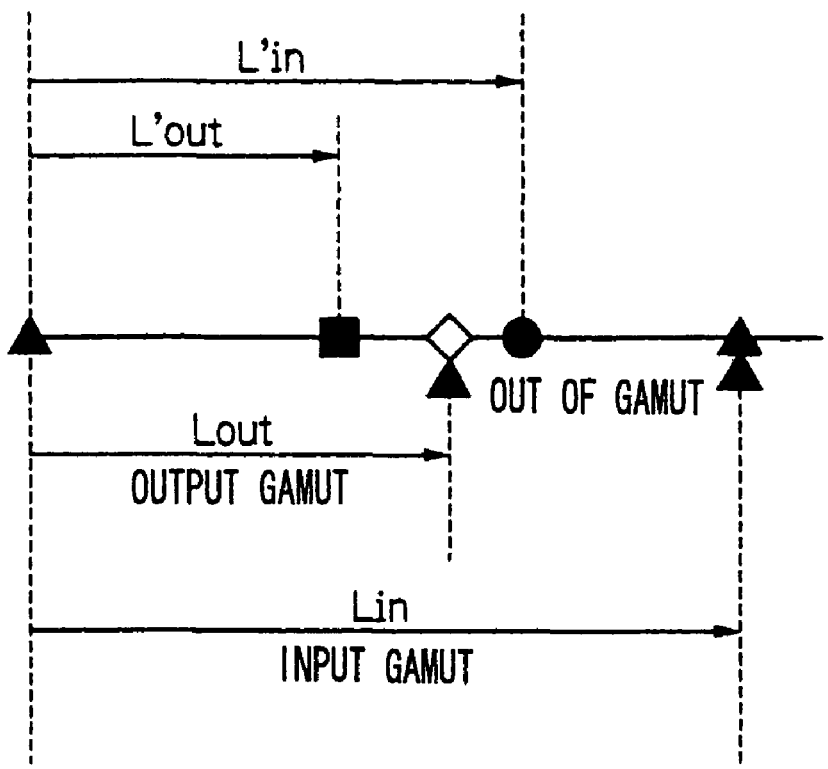
FIG. 13 is a describing view showing an example of non-linear gamut compression/decompression processing.

FIG. 13 is an explanatory drawing showing an example of the non-linear gamut compression/decompression processing. As shown in FIG. 13, the distance L'out from the achromatic color point on the conversion vector to the output image signal is obtained, using the non-linear function of the formula (1) and formula (2) shown as follows, based on the respective distances Lin and Lout from the achromatic color point on the conversion vector to the respective outer points of the input color gamut and the output color gamut, the distance L'in from the achromatic color point to the input image signal, and the compression coefficient Cn11 (shown as Cn1 in FIG. 13) set according to the color rendering intent and color converting object.

$$L'out = L'in \times (Lout/Lin)^{f(x)} \quad (1)$$

$$f(x) = (L'in/Lin)^{Cn11} \quad (2)$$

By changing the compression coefficient Cn11, it is possible to change the brightness and saturation compression ratio and the saturation gradation number.

Next, as the compression method about the above hue shift amount, the method described in, for example, Japanese Patent Application Laid-Open No. 2005-184601 may be adapted. In the method, the hue is converted by a predetermined hue conversion function. In the hue conversion function, the hue is changed in a way of changing the degree of the hue conversion according to the saturation in the input image signal, the hue varies widely in the high saturation region, while it does not change much in the low saturation region. The hue conversion function includes the compression coefficient as a parameter, which is set in order to attach a weight to the hue conversion degree in the saturation direction. Specifically, an index function like the following formula is used.

$$Cout = Cin - Cdif \times (Cdata/Cmax)^{Cn12} \quad (3)$$

In the formula (3), Cout is a hue angle of the output image signal, Cin is a hue angle of the input image signal, Cdif is the maximum saturation-hue shift amount, Cdata is the saturation in the input image signal, and Cmax is the saturation in the maximum saturation point. Further, Cn12 is the compression coefficient for weighting and it is the non-linear coefficient for adjusting the non-linear property.

It is possible to change the hue shift amount by changing the compression coefficient Cn12.

As the compression method about the brightness shift amount, the method described in, for example, Japanese Patent Application Laid-Open (JP-A) No. 2005-184602 may be adapted. In the method, brightness is converted by a predetermined brightness conversion function. In the brightness conversion function, the brightness is changed in a way of changing the degree of the brightness conversion according to the saturation in the input image signal; the brightness varies widely in the high saturation region, while it does not change much in the low saturation region. The brightness conversion function includes the compression coefficient as a parameter, which is set in order to weight to the brightness conversion degree in the saturation direction. Specifically, an index function like the following formula is used.

$$Lout = Lin - Ldif \times (Cin/Cmax)^{Cn13} \quad (4)$$

In the formula (4), Lout is the brightness value after the conversion, Lin is the brightness value before the conversion, Ldif is the brightness adjustment value, Cin is the saturation in the input image signal, and Cmax is the saturation of the maximum saturation point in the input color gamut. Further, Cn13 is the compression coefficient for weighting and it is the non-linear coefficient for adjusting the non-linear property.

The brightness shift amount may be changed by changing the compression coefficient Cn13.

In Step 110, the device characteristics of the input device and the output device are evaluated according to the input device profiles and the output device profiles. The evaluation items include, for example, a volume of the whole color gamut, a color gamut volume of the low brightness side, a color gamut volume of the high brightness side, an area of a hue cross section surface in a specified hue, and a maximum saturation of primary colors (cusp) in the input device and the output device, gradation number of a input device, and gradation number of a output device. These may be calculated from the input device profile and the output device profile. A color gamut volume of the low brightness side means a volume of a region having lower brightness than the substantially same brightness of the maximum saturation of a predetermined color and the color gamut volume of the high brightness side means the volume of a region having the higher brightness than the low brightness region.

Hereinafter, an example of evaluation will be described. It is evaluated according to the standard device profile stored in the memory 13.

The first evaluation method is to determine whether the gradation number of the output device is less than the standard gradation number required from the standard device profile: when it is less, it is determined (evaluated) that the color rendering intent has to be changed, while when it is not, it is determined that it does not have to be changed.

The second evaluation method is to determine whether the volume of the whole color gamut in the input device is larger than the volume of the whole standard color gamut obtained from the standard device profile or whether the volume of the whole color gamut in the output device is smaller than the volume of the whole standard color gamut. When the volume of the whole color gamut in the input device is larger than the volume of the whole standard color gamut or when the volume of the whole color gamut in the output device is smaller than the volume of the whole standard color gamut, it is judged that the color rendering intent has to be changed; otherwise, it is judged that the color rendering intent does not have to be changed. The color gamut volume of the low brightness side, the color gamut volume of the high brightness side, or the area of the hue cross section surface in the specified hue, rather than the volume of the whole color gamut, may be used to determine the above in the same way.

The third evaluation method is to determine whether the maximum saturation (CUSP) of the primary colors in the color gamut at the output side is lower than the maximum saturation of the primary colors in the standard color gamut set from the standard device profile and whether the maximum saturation (CUSP) of the primary colors in the color gamut at the input side is higher than the maximum saturation of the primary colors in the standard color gamut. When the maximum saturation (CUSP) of the primary colors in the color gamut at the output side is lower than the maximum saturation of the primary colors in the standard color gamut, or when the maximum saturation (CUSP) of the primary colors in the color gamut at the input side is higher than the maximum saturation of the primary colors in the standard color gamut, it is judged that the color rendering intent has to be changed; otherwise, it is judged that the color rendering intent does not have to be changed.

In Step 112, it is judged that whether or not the color rendering intent has to be changed according to the evaluation result in Step 110; when the color rendering intent has to be changed, the processing moves to Step 114, while when it does not have to be changed, the processing moves to Step 122.

The case where the color rendering intent has to be changed may be a case where only a ratio between plural color rendering intents is newly set, where only another one different from the plural color rendering intents is newly set in place of one of the plural color rendering intents, or where another one different from the plural color rendering intents is newly set in place of one of them and a ratio of the color rendering intents is newly set.

In Step 114, the evaluation result in Step 110 is displayed and a color rendering setting screen (not illustrated) for resetting the color rendering intents is displayed on the UI 3. For example, in the case where it is judged according to the first evaluation method that the color rendering intent has to be changed, for example, when the ratio of the intents a user specifies is at the point A in the distribution graph of FIG. 14, it is changed to the point B in order to decrease the degree of Perceptual and this ratio of the intents corresponding to the point B is a new color rendering intent. A color rendering setting screen for setting whether or not to set the new color rendering intent is displayed on the UI screen 3. How to change the ratio of the intents is determined, for example, based on the specified ratio of the intents which is specified in advance and how much smaller the gradation number of the output device is than the standard gradation number.

Figure 15:
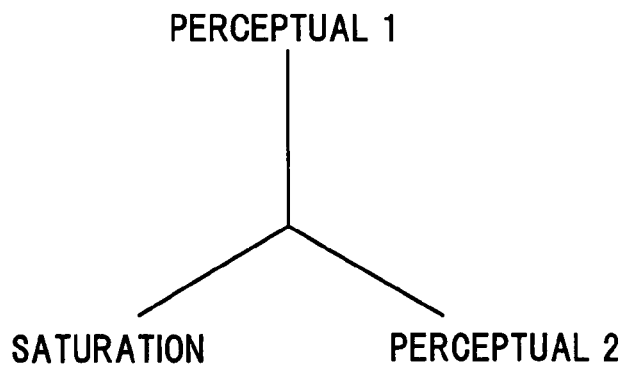
FIG. 15 is a concept view for use in describing change of the color rendering intent.

In the case where it is judged according to the second evaluation method that the color rendering intent has to be changed, for example, Colorimetric that is the intent to convert the color such that the color difference may be the minimum is deleted from the three intents, as shown in FIG. 15, Perceptual 2 having a medium color reproduction characteristic between Perceptual and Colorimetric, in other words, Perceptual 2 having a higher compression ratio than that of Colorimetric is added as a new intent, and the color rendering setting screen is displayed on the UI screen 3, inducing a user to newly set a ratio of the three intents; Perceptual 1 (original perceptual), Saturation, and Perceptual 2.

Figure 16:
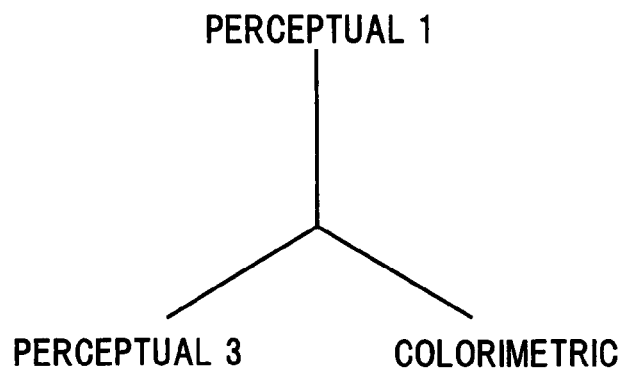
FIG. 16 is a concept view for use in describing change of the color rendering intent.

In the case where it is judged according to the third evaluation method that the color rendering intent has to be changed, for example, Saturation that is the intent making much of saturation is deleted from the three intents, as shown in FIG. 16, Perceptual 3 having a medium color reproduction characteristic between Perceptual and Saturation is added as a new intent, and the color rendering setting screen is displayed on the UI screen 3, inducing a user to newly set a ratio of the three intents; Perceptual 1 (original perceptual), Colorimetric, and Perceptual 3.

Figure 14:
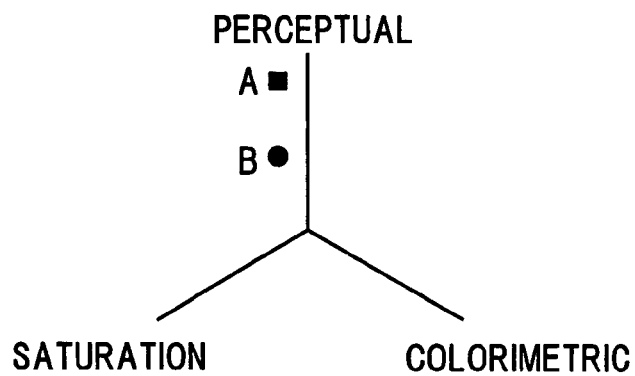
FIG. 14 is a concept view for use in describing change of the color rendering intent.

A user determines whether or not to set the new color rendering intent in referring to the color rendering setting screen displayed on the UI screen 3. For example, when the point A is changed to the point B, as shown in FIG. 14, the user selects whether this point B is set as a new color rendering intent or the color rendering intent which has been set in Step 102 is used as it is. When a new intent is set as shown in FIG. 15 and FIG. 16, the user selects whether a ratio of the intents is newly set or the color rendering intent which has been set in Step 102 is used as it is.

In Step 116, it is determined whether or not a user sets a new color rendering intent; when a new color rendering intent is set, the processing moves to Step 118, while when the user selects the original color rendering intent, the processing moves to Step 122.

In Step 118, a compression coefficient according to the color rendering intent newly set is established in the same way as in Step 106.

In Step 120, the color conversion coefficient setting section 12 creates a color conversion LUT according to the color converting object and the color rendering intent newly set by a user and stores it into the memory 13. The values of the lattice points L*, a*, b* of each divided lattice of the three dimensional CIE-L*a*b* color space are converted by the respective compression functions using the compression coefficients Cn11 to Cn13 reset in Step 118, and the color conversion LUT showing the correspondence relation between each lattice point and each value of YMCK is created by obtaining the values of the YMCK corresponding to the values of the lattice points L*, a*, b*. The created color conversion LUT is output to the color converter 11 and stored into the memory 13 associated with the color rendering intent and the color converting object. From the next time, when the same color rendering intent and color converting object is set, it is not necessary to create the color conversion LUT but it may be read out from the memory 13 to convert the color immediately.

In creating the color conversion LUT, the color conversion LUT with plural kinds of black generation (K), for example, for graphics, for images, and the like set there may be created so that a user may select a desired black generation.

Not only the color conversion LUT of Lab-YMCK but also the color conversion LUT of RGB-YMCK may be created and stored into the memory 13.

While, in Step 122, a color conversion LUT is created by using the compression coefficient set in Step 106 in the same way as in Step 120, output to the color converter 11, and stored into the memory 13.

The created color conversion LUT may be stored with a name set by the user in the memory 13, and by specifying the name may the color conversion LUT corresponding to the name may be read out from the memory 13 by specifying the name. Alternatively, rather than the color conversion LUT, the respective compression coefficients set in Step 106 may be stored with a name set by the user into the memory 13, and by specifying a name, the compression coefficient corresponding to the name may be read out from the memory 13. In this case, the color conversion LUT as mentioned above may be created by using the compression coefficient read out.

In Step 124, the color converter 11 converts the input image signal inputted to the color converter 11 into the output image signal, with the color conversion LUT outputted from the color conversion coefficient setting section 12. After the input image signal of the RGB color space is converted into the signal of the CIE-L*a*b* color space, the values of L*, a*, b* are converted into the values for the color image signal of YMCK. When the color conversion LUT doesn't include the values of YMCK corresponding to the values of L*, a*, b* of the input image signal, the values of YMCK are obtained by interpolating the values around the color conversion LUT in the known interpolation method.

In the exemplary embodiment, intents are not the fixed ones but the ratio among the intents may be set by a user and the gamut compression/decompression function may be determined (the compression coefficient is determined) for every element of the gamut compression/decompression according to the ratio, to perform the gamut compression/decompression processing, which enables the color conversion according to the user's taste. Further, by setting the ratio among the intents, it is possible for a user to perform the color conversion easily according to his or her intention without any specific knowledge about the color conversion.

Further, since the characteristics of the input and output devices may be evaluated and according to the results, the ratio between the intents may be changed, color may be reproduced according to a user's intention, regardless of a difference in color gamut size between the input and output profiles, a difference in the gradation characteristic, or the like.

In the exemplary embodiment, although the case where the color conversion is performed by setting the color rendering intent and the color converting object in Step 102 and creating the color conversion LUT corresponding to this or reading out it from the memory 13 has been described, the gamut compression/decompression element may be set by a user. By enabling a user to define the gamut compression/decompression element, it is possible to do the fine setting and reproduce a color properly according to the user's intention.

A user may be enabled to do such a setting that a predetermined primary color of CMYK and the like is reproduced in pure color. In this case, the above-described color conversion is not performed on the predetermined primary color, but the other color conversion processing of always converting the pure color into pure color is performed there. This satisfies the user's request to reproduce a pure color always just in a pure color.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. A color conversion coefficient creating device comprising:
 a storage unit;
 a display unit that displays a color rendering setting screen that sets a compression coefficient based on a ratio between a plurality of color rendering intents, the ratio being set by a user controlling a graphical user interface;
 an evaluation unit configured to evaluate an input device characteristic and an output device characteristic according to a predetermined standard device characteristic and the compression coefficient;
 a creating unit configured to create a color conversion coefficient for converting a first image signal in a first color space input from the input device into a second image signal for the output device in a second color space different from the first color space, wherein the creating unit is configured to change the ratio between the plurality of color rendering intents when a gradation number of the output device is less than a predetermined standard gradation number to a new ratio,
 the creating unit is configured to change the color rendering intents when a volume of a whole color gamut of the input device is larger than a volume of a predetermined standard whole color gamut or when the volume of the whole color gamut of the output device is smaller than the volume of the predetermined whole standard color gamut, and
 the creating unit is configured to change the color rendering intents when a maximum saturation of primary colors in a color gamut of the output device is lower than a maximum saturation of primary colors in a predetermined standard color gamut, or when the maximum saturation of the primary colors in the color gamut in the input device is higher than the maximum saturation of the primary colors in the predetermined standard color gamut; and
 a determining unit that determines if a color conversion look-up table in the storage unit exists based on the set ratio, wherein
 if the determining unit determines that the color conversion look-up table does not exist, then
 the evaluation unit evaluates the input device characteristic and output device characteristic,
 the display unit displays a color rendering intent re-setting screen for re-setting the compression coefficient based on the new ratio if the evaluated input device characteristic and the output device characteristic is not within the predetermined standard device characteristic, the new ratio only being set if the user agrees, and
 the creating unit creates the color conversion coefficient based on the re-set compression coefficient if the user agrees from the color rendering intent re-setting screen, and based on the set compression coefficient if at least one of two conditions are met: 1) the user does not agree from the color rendering intent re-setting screen, and 2) the evaluated input device characteristic and the output device characteristic is within the predetermined standard device characteristic, and
 the creating unit stores a color conversion look-up table based on the created color conversion coefficient in the storage unit.

2. The color conversion coefficient creating device of claim 1, wherein
 the evaluating unit evaluates the input device characteristic and the output device characteristic according to at least one of a color gamut size or the gradation characteristic of the input device and the output device.

3. The color conversion coefficient creating device of claim 1, wherein
 the predetermined processing comprises one of the following processes: re-setting only the ratio between the plurality of color rendering intents; re-setting only another color rendering intent different from the plurality of color rendering intents, in place of one of the plurality of color rendering intents; or re-setting another color rendering intent different from the plurality of color rendering intents, in place of one of the plurality of color rendering intents and re-setting the ratio of the plurality of color rendering intents.

4. The color conversion coefficient creating device of claim 1, further comprising
 a reporting unit which reports the evaluation result.

5. The color conversion coefficient creating device of claim 1, wherein
the color rendering intents include at least two of Perceptual, Saturation, or Colorimetric defined in an ICC profile.

6. The color conversion coefficient creating device of claim 1, wherein
the color rendering intents include at least two of monitor emphasizing, saturation emphasizing, gradation reproducibility, contrast, or colorimetric matching.

7. The color conversion coefficient creating device of claim 1, wherein
the setting unit can set pure color reproduction for a predetermined primary color.

8. The color conversion coefficient creating device of claim 1,
wherein the color conversion look-up table comprises a plurality of kinds of black generation and the setting unit can set the black generation.

9. The color conversion coefficient creating device of claim 1, wherein
the setting unit can specify a color converting object.

10. The color conversion coefficient creating device of claim 1, wherein
the setting unit can specify a specific color and a conversion target value of the specific color.

11. A color conversion coefficient creating method comprising:
setting a compression coefficient based on a ratio between a plurality of color rendering intents, the ratio being set by a user controlling a graphical user interface;
determining if a color conversion look-up table in storage unit exists based on the set ratio;
if the color conversion look-up table does not exist, evaluating an input device characteristic and an output device characteristic according to a predetermined standard device characteristic, according to a predetermined standard device characteristic and the compression coefficient;
displaying a color rendering intent re-setting screen for re-setting the compression coefficient based on a new ratio if the evaluated input device characteristic and the output device characteristic is not within the predetermined standard device characteristic, the new ratio only being set if the user agrees;
creating a color conversion coefficient for converting a first image signal in a first color space input from the input device into a second image signal for the output device in a second color space different from the first color space, and if the color conversion look-up table does not exist, based on the re-set compression coefficient if the user agrees from the color rendering intent re-setting screen, and based on the set compression coefficient if at least one of two conditions are met: 1) the user does not agree from the color rendering intent re-setting screen, and 2) the evaluated input device characteristic and the output device characteristic is within the predetermined standard device;
if the color conversion look-up table does not exist, storing a color conversion look-up table based on the created color conversion coefficient in a storage unit;
changing the ratio between the plurality of color rendering intents when a gradation number of the output device is less than a predetermined standard gradation number to the new ratio;
changing the color rendering intents when a volume of a whole color gamut of the input device is larger than a volume of a predetermined standard whole color gamut or when the volume of the whole color gamut of the output device is smaller than the volume of the predetermined whole standard color gamut; and
changing the color rendering intents when a maximum saturation of the primary colors in a color gamut of the output device is lower than a maximum saturation of the primary colors in a predetermined standard color gamut, or when the maximum saturation of the primary colors in the color gamut in the input device is higher than the maximum saturation of the primary colors in the predetermined standard color gamut.

12. The color conversion coefficient creating method of claim 11, wherein
the evaluating further comprises evaluating the input device characteristic and the output device characteristic, according to at least one of a color gamut size or a gradation characteristic of the input device and the output device, by comparing with a predetermined standard device characteristic.

13. A non-transitory computer readable medium storing a program for causing a computer to execute a process for creating color conversion coefficient, the process comprising:
setting a compression coefficient based on a ratio between a plurality of color rendering intents, the ratio being set by a user controlling a graphical user interface;
determining if a color conversion look-up table in storage unit exists based on the set ratio;
if the color conversion look-up table does not exist, evaluating an input device characteristic and an output device characteristic according to a predetermined standard device characteristic, according to a predetermined standard device characteristic and the compression coefficient;
displaying a color rendering intent re-setting screen for re-setting file compression coefficient based on a new ratio if the evaluated input device characteristic and the output device characteristic is not within the predetermined standard device characteristic, the new ratio only being set if the user agrees;
creating a color conversion coefficient for converting a first image signal in a first color space input from the input device into a second image signal for the output device in a second color space different from the first color space, and if the color conversion look-up table does not exist, based on the re-set compression coefficient if the user agrees from the color rendering intent re-setting screen, and based on the set compression coefficient if at least one of two conditions are met: 1) the user does not agree from the color rendering intent re-setting screen, and 2) the evaluated input device characteristic and the output device characteristic is within the predetermined standard device;
if the color conversion look-up table does not exist, storing a color conversion look-up table based on the created color conversion coefficient in a storage unit;
changing the ratio between the plurality of color rendering intents when a gradation number of the output device is less than a predetermined standard gradation number to the new ratio;
changing the color rendering intents when a volume of a whole color gamut of the input device is larger than a volume of a predetermined standard whole color gamut or when the volume of the whole color gamut of the output device is smaller than the volume of the predetermined whole standard color gamut; and
changing the color rendering intents when a maximum saturation of the primary colors in a color gamut of the output device is lower than a maximum saturation of the primary colors in a predetermined standard color gamut, or when the maximum saturation of the primary colors in the color gamut in the input device is higher than the maximum saturation of the primary colors in the predetermined standard color gamut.

14. The computer readable medium of claim 13, wherein the evaluating further comprises evaluating the input device characteristic and the output device characteristic, according to at least one of a color gamut size or a gradation characteristic of the input device and the output device, by comparing with a predetermined standard device characteristic.

15. The color conversion coefficient creating device of claim 1, wherein
the graphical user interface is a three-dimensional axis.

16. The color conversion coefficient creating method of claim 11, wherein
the graphical user interface is a three-dimensional axis.

17. The color conversion coefficient creating method of claim 13, wherein
the graphical user interface is a three-dimensional axis.

* * * * *